United States Patent [19]

Yatabe et al.

[11] Patent Number: 4,668,046

[45] Date of Patent: May 26, 1987

[54] TRANSMISSION TYPE SCREEN APPARATUS

[75] Inventors: Yoshio Yatabe; Tadasu Yatabe, both of Tokyo, Japan

[73] Assignee: YUP Company, Ltd., Tokyo, Japan

[21] Appl. No.: 832,127

[22] Filed: Feb. 24, 1986

[30] Foreign Application Priority Data

Feb. 25, 1985 [JP] Japan .................................. 60-34490
Feb. 4, 1986 [JP] Japan .................................. 61-21098

[51] Int. Cl.⁴ ............................................. G03B 21/56
[52] U.S. Cl. .................................................. 350/117
[58] Field of Search ...................... 350/117, 124, 125; 352/59, 70, 133; 353/79, 94

[56] References Cited

U.S. PATENT DOCUMENTS 4,473,355  9/1984  Pongratz ......................... 350/125 X Primary Examiner—Richard A. Wintercorn
Attorney, Agent, or Firm—Schwartz, Jeffery, Schwaab, Mack, Blumenthal & Evans

[57] ABSTRACT

A transmission type projection multi-screen apparatus includes a frame, a plurality of transmission type screen units closely arranged in the frame thereby to form a multi-screen, a plurality of projectors at the rear of the screen units for projecting lights of a picture image to the screen units, respectively, and means fixed to the frame for supporting the screen units. The supporting means is placed substantially in a dead angle of the lights.

9 Claims, 12 Drawing Figures

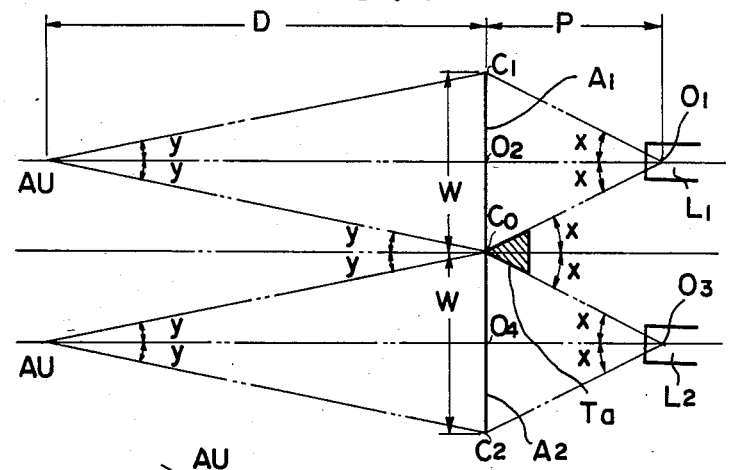
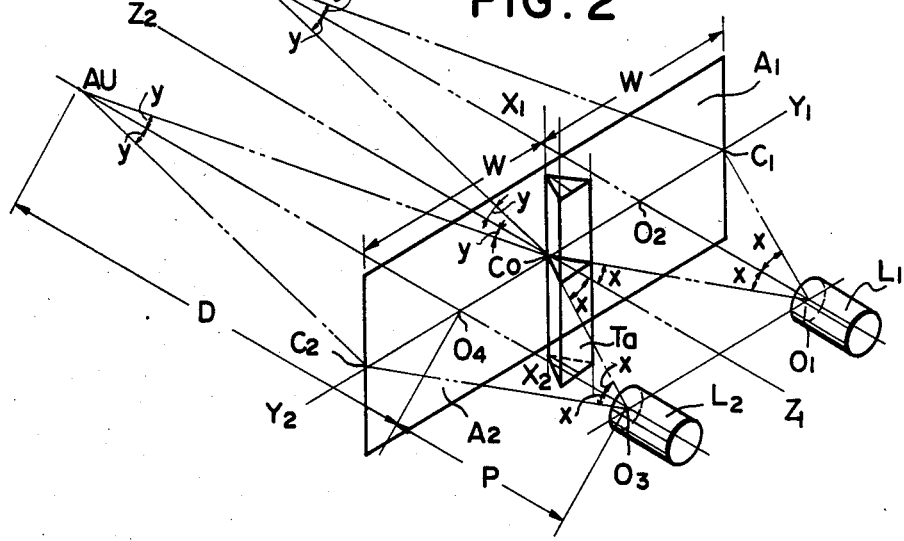

4,668,046

TRANSMISSION TYPE SCREEN APPARATUS

BACKGROUND OF THE INVENTION

This invention relates to a transmission type projection screen apparatus and relates in particular to a multi-screen apparatus in which plural transmission screen units are closely arranged in horizontal and/or vertical directions in combination with plural projectors so as to constitute a large projection screen system.

FIG. 7 shows a conventional transmission type projection screen having a circular Fresnel lens $11a$ and a lenticular lens $12a$ at its opposite sides, which are made essentially of a transparent synthetic resin such as acrylic resin, vinyl chloride resin, styrene, resin, polycarbonate resin, acrylonitrile-styrene copolymerized resin or the like as one body. Since relative positions of the lenses $11a$, $12a$ can be precisely maintained, such a projection screen has been used in practice. However, it is difficult to manufacture a large size screen.

FIG. 8 shows another conventional projection screen composed of two sheets such as a combination of a Fresnel lens sheet $11b$ and a lenticular lens sheet $12b$ which are separately made of one of the above-stated synthetic resins and adhered to each other. Since a broad Fresnel lens sheet cannot be manufactured, it cannot be practically used in case of a large screen.

It has been recently proposed to produce a large multi-screen apparatus composed of many small transmission screen units which are supported by an aluminum sash frame and plural supports. However, the supports appear as relatively wide seams on the multi-screen, which reduces commercial values.

SUMMARY OF THE INVENTION

The object of this invention is to provide a transmission type projection multi-screen apparatus which can have a large and/or broad riding projection surface on which only minor seams appear.

According to this invention, there is provided a transmission type projection multi-screen apparatus comprising a frame, a plurality of transmission type screen units closely arranged in the frame thereby forming a multi-screen, a plurality of projectors at the rear of the screen units for projecting lights of a picture image to the screen units, respectively, and means fixed to the frame for supporting the screen units, the supporting means being placed substantially in a dead angle of the lights.

BRIEF DESCRIPTION OF THE DRAWINGS

FIG. 1 is a schematic plan view showing a multi-screen apparatus according to this invention in which two screen units are closely arranged in a horizontal row;

FIG. 2 is a schematic perspective view of the multi-screen apparatus shown in FIG. 1;

DESCRIPTION OF THE EMBODIMENTS

Referring now to FIGS. 1 and 2, two transmission type screen units $A_1$, $A_2$ are closely arranged in a horizontal row so as to form a flat projection surface. Two projectors $L_1$, $L_2$ are positioned at the rear of the screen units $A_1$, $A_2$ and project partial lights of a picture image to the screen units $A_1$, $A_2$, respectively. The screen units $A_1$, $A_2$ each have a width W. A projection distance P is a distance between projection lenses $O_1$, $O_3$ of the projectors $L_1$, $L_2$ and points $O_2$, $O_4$ of the screen units $A_1$, $A_2$. A viewing distance D is a distance between the points $O_2$, $O_4$ of the screen units $A_1$, $A_2$ and typical points AU of viewers who are in front of the screen units $A_1$, $A_2$.

Assuming that a line passing the points $O_2$, $O_4$ intersects a front surface of the screen units $A_1$, $A_2$ at points $C_0$, $C_1$, $C_2$, which point $C_0$ is common to the screen units $A_1$, $A_2$, the points $C_1$, $C_0$, $C_2$ are in a horizontal line $Y_1$-$Y_2$ passing each horizontal center of the screen units $A_1$, $A_2$ while a line $X_1$-$X_2$ is a vertical line along a seam formed between the screen units $A_1$, $A_2$. A line $Z_1$-$Z_2$ passes the point $C_0$ and is at a right angle to both the line $X_1$-$X_2$ and the line $Y_1$-$Y_2$. Each projection light bundle angle of the projection lenses $O_1$, $O_3$ is 2x. Each viewing angle of the viewers is 2y. The angle $O_1 C_0 Z_1$ is x. The angle $O_3 C_0 Z_1$ is x. Therefore, a dead angle of the projection lights from the projectors $L_1$, $L_2$ is 2x at a joint portion of the screen units $A_1$, $A_2$. The angle AU $C_0 Z_2$ is y.

In view of the foregoing, a support Ta of a triangular section having a tip angle of 2x or less is placed whithin a V-shaped space formed between the adjacent screen units $A_1$, $A_2$ corresponding to the dead angle 2x for supporting the adjacent screen units $A_1$, $A_2$ whereby the support Ta cannot be easily seen from the viewers.

Figure 3:
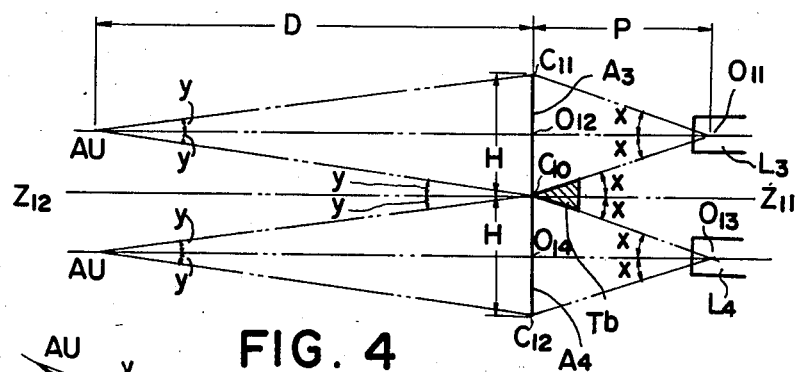
FIG. 3 is a schematic plan view showing a further multi-screen apparatus according to this invention in which two screen units are closely arranged in a vertical row.
Figure 4:
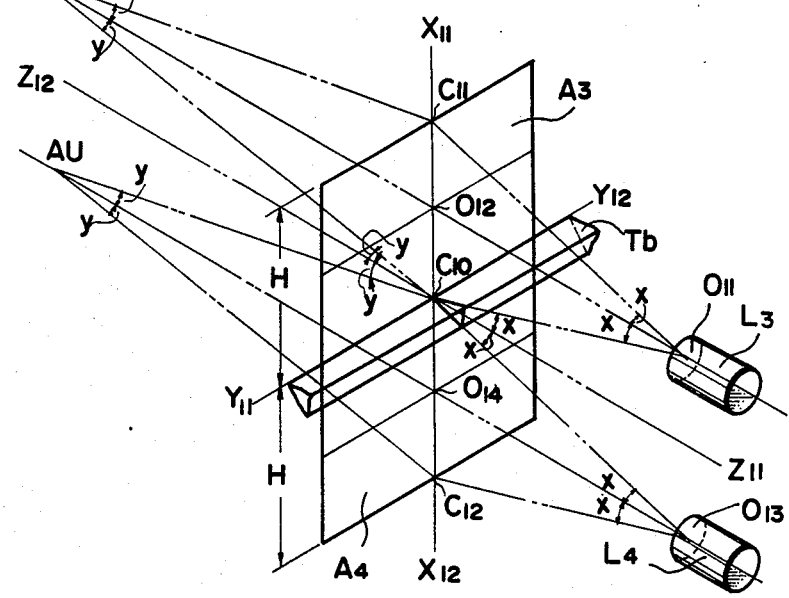
FIG. 4 is a schematic perspective view of the multi-screen apparatus shown in FIG. 3.

In FIGS. 3 and 4, two transmission type screen units $A_1$, $A_4$ are closely arranged in a vertical row so as to form a flat projection surface. Two projectors $L_3$, $L_4$ are placed at the rear of the screen units $A_1$, $A_2$ and project partical lights of a picture image to the screen units $A_3$, $A_4$, respectively. The screen units $A_3$, $A_4$ each has a height H. A projection distance P is a distance between projection lenses $O_{11}$, $O_{12}$ of the projectors $L_3$, $L_4$ and points $O_{12}$, $O_{14}$ of the screen units $A_3$, $A_4$. A viewing distance D is a distance between the points $O_{12}$, $O_{14}$ of the screen units $A_3$, $A_4$ and typical points AU of viewers who are in front of the screen units $A_3$, $A_4$. Assuming that a line passing the points $O_{12}$, $O_{14}$ intersects each front surface of the screen units $A_3$, $A_4$ at points $C_{10}$, $C_{11}$, $C_{12}$, which point $C_0$ is common to the screen units $A_3$, $A_4$, the points $C_{11}$, $C_{10}$, $C_{12}$ are in a line $X_{11}-X_{12}$ passing each vertical center of the screen units $A_3$, $A_4$ while a line $Y_{11}-Y_{12}$ is a horizontal line along a seam formed between the adjacent screen units $A_3$, $A_4$. A line $Z_{11}-Z_{12}$ passes the point $C_{10}$ and is at a right angle to both the line $X_{11}-X_{12}$ and the line $Y_{11}-Y_{12}$.

Each projecton light bundle angle of the projectors $L_3$, $L_4$ is 2x while a viewing angle of the viewers is 2y. The angle $O_{11} C_{10} Z_{11}$ is x, and the angle $O_{13} C_{10} Z_{11}$ is x. Thus, a dead angle of the projection lights from the projectors $L_3$, $L_4$ is 2x at a joint portion of the screen units $A_3$, $A_4$. The angle $AU\ C_{10} Z_{12}$ is y.

In view of the foregoing, a support Tb of a triangular section having a tip angle of 2x or less is placed whithin the dead angle 2x for supporting the screen units $A_3$, $A_4$ whereby the support Tb cannot be easily seen from the viewers.

Figure 5:
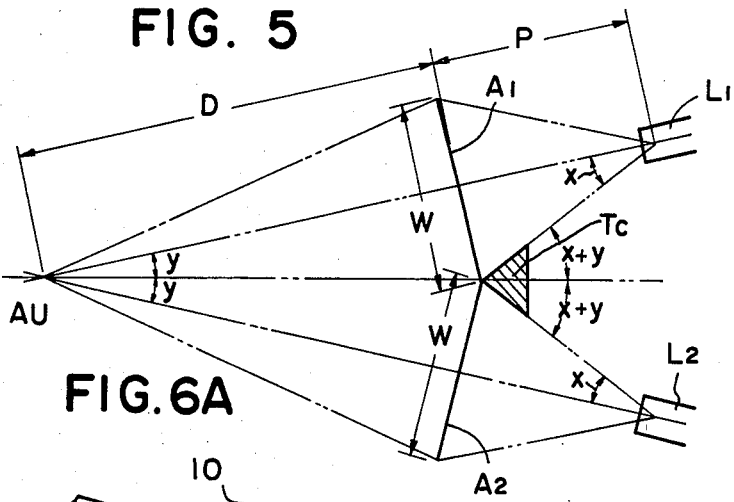
FIG. 5 is a schematic plan view showing another multi-screen apparatus according to this invention in which two screen units are closely arranged at the same distance from a viewer.

In FIG. 5, two transmission type screen units $A_1$, $A_2$ are closely arranged along a horizontal imagined circle at the same distance D from a typical viewer AU in front of the screen units $A_1$, $A_2$ and so as to form a bent projection surface. Two projectors $L_1$, $L_2$ project partial lights of a picture image to the screen units $A_1$, $A_2$, respectively, with a projection distance P. Assuming that a half of a projection light bundle angle from the projectors $L_1$, $L_2$ is x and a half of a viewing angle from the viewer is y, a dead angle of the lights from the projectors $L_1$, $L_2$ is 2(x+y) at a joint portion of the screen units $A_1$, $A_2$.

Thus, a support Tc of a triangular section having a tip angle of 2(x+y) or less is placed whithin the dead angle 2(x+y) for supporting the screen units $A_1$, $A_2$ whereby the support Tc cannot be easily seen from the viewer.

Although not shown in the drawings, two screen units $A_1$, $A_2$ can be arranged along a vertical circle or in a height direction at the same distance from a viewer as in the embodiment of FIG. 5.

Referring again to FIGS. 1 and 2, the dead angle of the projection lights will be explained.

Assuming that the screen units $A_1$, $A_2$ each have a height H of 900 mm and a width W of 1,800 mm, a diagonal line thereof has a length of about 2,000 mm. Usually, the projection distance P is selected to be equal to the length of the diagonal line, that is, about 2,000 mm. According to the following equation, $$\tan x = W/2P = 1,800/(2 \times 2,000)$$

X is about 24 degrees. In this case, the dead angle is about 48 degrees so that the support Ta can have a large tip angle so as to provide a high structural strength. The same can be said of the embodiments of FIGS. 3 to 5.

In the embodiments of FIGS. 1 to 5, the supports Ta, Tb or Tc can be composed of two halves each having a tip angle of x or (x+y).

Figure 6A:
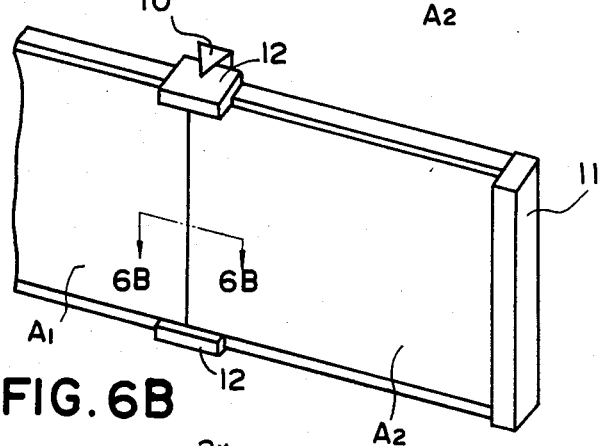
FIG. 6A is a perspective view showing another multi-screen apparatus according to this invention.
Figure 6B:
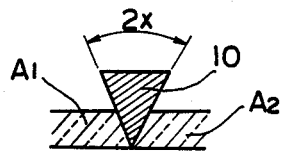
FIG. 6B is a sectional view taken along the line 6B—6B of FIG. 6A.

FIGS. 6A and 6B show a further embodiment of this invention essentially corresponding to the embodiment of FIGS. 1 and 2. Two transmission type screen units $A_1$, $A_2$ are closely joined at their side edges and supported by a support 10 and a frame 11 which are joined by two U-shaped connectors 12. The support 10 is a triangular post placed whithin a dead angle (2x) of projection lights from two projectors (not shown) placed at the rear of the screen units $A_1$, $A_2$.

Figure 6C:
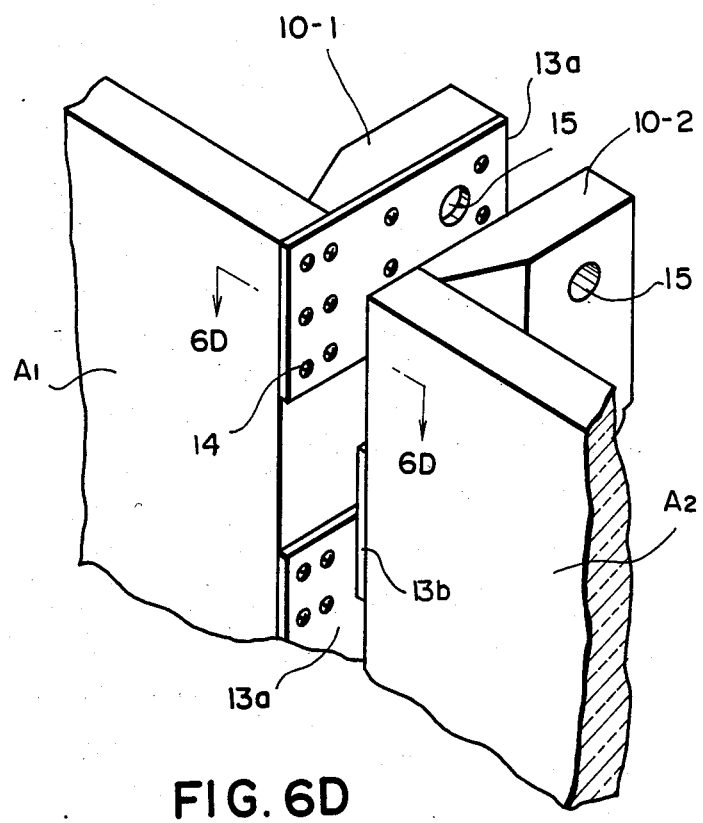
FIG. 6C is a disassembled view showing a supporting means and its related members of a multi-screen apparatus according to this invention.
Figure 6D:
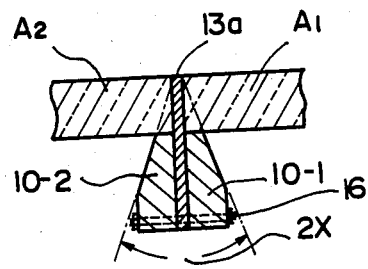
FIG. 6D is a sectional view showing a joint portion taken along the line 6D of the apparatus shown in FIG. 6C in which adjacent screen units are joined to each other.

FIGS. 6C and 6D show a joint portion of a further embodiment of this invention. Two transmission type rectangular screen units $A_1$, $A_2$ are closely arranged at their side edges and supported by two supports 10-1, 10-2 and plural holder plates 13a, 13b which are fixedly joined to each other by screws 14. The holder plates 13a, 13b are also fixed to the opposite side edges of the screen units $A_1$, $A_2$, respectively, by means of the screws 14. In other words, the screen unit $A_1$ is fixed to the support 10-1 by means of the holder plates 13a while the screen unit $A_2$ is fixed to the support 10-2 by means of the holder plates 13b. Those supports 10-1, 10-2 are fastened by a bolt 16 set through each hole 15 of the supports 10-1, 10-2. In such a fastened condition, the holder plates 13a, 13b are positioned one after the other along the side edges of the screen units $A_1$, $A_2$. As shown in FIG. 6D, the supports 10-1, 10-2 and a majority of the holder plates 13a, 13b are positioned within the dead angle 2x of the projection lights from projectors (not shown) placed at the rear of the screen units $A_1$, $A_2$ as in the embodiment of FIGS. 1 and 2. Merely each front end surface of the holder plates 13a, 13b appears on a multi-screen projection surface. A thickness of the front end of the holder plates 13a, 13b can be limited to several millimeters.

Figure 6E:
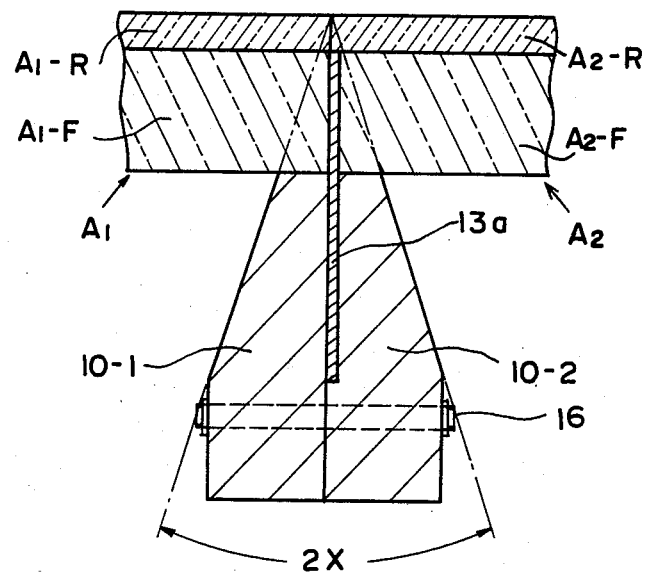
FIG. 6E is a sectinal view of another joint portion of a multi-screen apparatus according to this invention.
Figure 7:
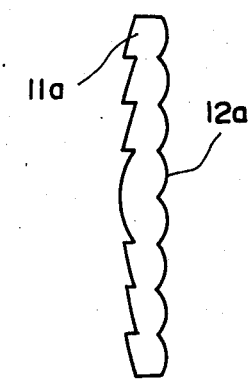
FIG. 7 is a side view showing a conventional projection screen.
Figure 8:
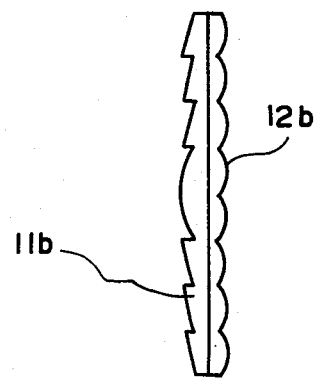
FIG. 8 is a side view showing another conventional projection screen.

FIG. 6E shows another embodiment of this invention which is similar to the embodiment of FIGS. 6C and 6D except for the construction of the screen units $A_1$, $A_2$. In FIG. 6E, the screen units $A_1$, $A_2$ are composed of lenticular lenses $A_1$-R, $A_2$-R joined directly to each other at their side edge and Fresnel lenses $A_1$-F, $A_2$-F joined indirectly through the holder plates 13a, 13b whereby the front ends of the holder plates 13a, 13b do not appear on a multi-screen projection surface. In other words, the holder plates 13a, 13b are inserted in a narrow groove of a channel shape forme in the adjacent Fresnel lenses. The supports 10-1, 10-2 and the holder plates 13a, 13b are completely positioned within the dead angle 2x of projection lights from projectors (not shown) placed at the rear of the screen units.

The supports 10-1, 10-2 and their related members shown in FIGS. 6A to 6E can be also applied to the embodiments of FIGS. 3 to 5 as well as any other multi-screen apparatus such as a large multi-screen apparatus which is, for example, composed of 9 screen units supported by plural supports of a lattice form in a rectangular frame.

The supports may be solid or hollow in any desired shape and made of aluminum or steel. They are to be joined to each other and also to the frame by adhesives, welding or any other fixing means.

It is preferable that the width of a seam formed between the adjacent screen units $A_1$ and $A_2$, $A_3$ and $A_4$ is limited to resolving powers of viewers' eyes. In general, the visual angle of such resolving powers is 0.00029. For example, resolving powers can be shown with respect to distances between viewers' eyes and a mutliscreen as follows:

| Distance (mm) | Resolving Power (mm) |
| --- | --- |
| 250 | 0.07 |
| 500 | 0.15 |
| 1,000 | 0.3 |
| 2,000 | 0.6 |
| 5,000 | 1.2 |
| 10,000 | 2.4 |
| 20,000 | 5.0 |

Accordingly, even if the supports and their related elements appear on the multi-screen projection surface, they do not obstruct the view in case the width of them is less than a resolving power.

A broad multi-screen apparatus having a total width of 18,000 mm will be explained as an example. Ten screen units each having a width of 1,800 mm are closely arranged along an imagined circle having a radius equal to the viewing distance D as in FIG. 5. Ten projectors as set at the rear of the ten screen units, respectively.

The projection lenses of the projectors and a typical viewer are positioned in a conjugate relation to each other by the field lenses (Fresnel lenses) of the screen units. Thus, the viewer is in front of all screen units.

Each projection light bundle is uniformly distributed in a lateral direction by each directional lenticular lenses of the screen units. An image formed by each projection lenses of the projectors functions as a secondary light source and is distributed by the corresponding lenticular lens thereof in a predetermined manner. It takes place through the whole width of the broad multi-screen.

Plural screen units can be closely arranged along a circle having a radius larger than that of FIG. 5.

According to this invention, means for supporting the screen units do not obstruct the view because the supporting means is placed substantially within a dead angle of projection lights from the projectors. Viewers in front of the screen units apparently see only very minor seams between the adjacent screen units. Therefore, commercial values of a multi-screen apparatus according to this invention are remarkable, particularly in the case of movie-like pictures including quick motion pictures.

What is claimed is:

1. A transmission type projection multi-screen apparatus comprising:
    a frame;
    a plurality of transmission type screen units closely arranged in the frame thereby forming a multi-screen;
    plurality of projectors placed at the rear of the screen units for projecting projection lights of a picture image to the screen units, respectively; and
    means fixed to the frame for supporting the screen units, the supporting means being places substantially within a dead angle of the lights from the projectors,
    wherein the supporting means is a support having a triangular tip portion which is placed in a space formed between the adjacent screen units, the space corresponding to the dead angle of the lights.

2. The apparatus of claim 1, wherein the screen units are continuously arranged along a previously designed straight line.

3. The apparatus of claim 1, wherein the screen units are continuously arranged along a previously designed circle.

4. The apparatus of claim 1, wherein the supporting means is a support fixed to the adjacent screen units by a plurality of thin holder plates within the dead angle of the lights.

5. The apparatus of claim 4, wherein the thin holder plates are disposed at their front end portion between the adjacent screen units.

6. The apparatus of claim 5, wherein the support includes two halves, one of which is fixed to one of the adjacent screen units by some of the holder plates, and the other of which is fixed to the other of the adjacent screen units by the other holder plates.

7. The apparatus of claim 6, wherein the holder plates extend through a full thickness of the screen units so as to appear on the multi-screen.

8. The apparatus of claim 6, wherein the holder plates are fitted at their front end portion in a channel-shaped groove formed betwen the adjacent screen units.

9. The apparatus of claim 8, wherein the adjacent screen units include a lenticular lens sheet and a Fresnel lens sheet fixed thereto in a two-layer form and wherein the holder plates are positioned only at the Fresnel lens sheet of the screen units so that the lenticular lens sheets cover the holder plates at their front end.

* * * * *